United States Patent [19]

Bergsjö et al.

[11] Patent Number: 5,083,232
[45] Date of Patent: Jan. 21, 1992

[54] FAULT CURRENT LIMITER

[75] Inventors: Nils-Johan Bergsjö; Birger Drugge; Lars Liljestrand; Emile Schreurs, all of Västerås, Sweden

[73] Assignee: Asea Brown Boveri AB, Vasteras, Sweden

[21] Appl. No.: 649,179

[22] Filed: Feb. 4, 1991

Related U.S. Application Data

[63] Continuation of Ser. No. 428,930, Oct. 30, 1989, abandoned.

[30] Foreign Application Priority Data

Oct. 31, 1988 [SE] Sweden .................................. 8803918

[51] Int. Cl.$^5$ .......................... H02H 7/00; H01H 9/42
[52] U.S. Cl. ........................................ 361/11; 361/13; 361/19; 361/58
[58] Field of Search ................... 361/19, 58, 111, 141, 361/9, 13.8, 11

[56] References Cited

U.S. PATENT DOCUMENTS 3,529,210 9/1970 Toshio et al. ......................... 361/58
4,961,066 10/1990 Bergsjo ................................. 338/32

Primary Examiner—Todd E. DeBoer
Attorney, Agent, or Firm—Watson, Cole, Grindle & Watson

[57] ABSTRACT

A fault current limiter according to the invention comprises a contact device (K) to the contacts of which is connected a resistor/inductor combination comprising a series connection of a first (R1) and a second (R2) resistor as well as a third resistor/inductor (R3) connected in parallel with the series-connected resistors. The second resistor consists of a resistor with superconducting properties, dimensioned such that the change from superconducting to normally-conducting state occurs when the critical current density of the resistor is attained.

2 Claims, 1 Drawing Sheet

FAULT CURRENT LIMITER

This application is a continuation of application Ser. No. 428,930, filed Oct. 30, 1989 now abandoned.

TECHNICAL FIELD

Short circuits on power networks may cause great damage. It is therefore desirable to be able rapidly to limit both the amplitude and duration of the short circuit currents which may occur. The sensing means and circuit-breakers which are available at present have a time delay corresponding to a few cycles before the current can be broken. Because of the generally relatively large mechanical masses that are to be activated when a line circuit-breaker is to open, it is difficult to attain shorter break times. A generally known way of rapidly reducing a short circuit current is to connect a current limiting element in series with a circuit breaker. Different such current limiting elements are available. The invention comprises a fault current limiter which is based on the use of superconductors, a contact device and current limiting resistors.

BACKGROUND ART, THE PROBLEM

A superconducting material is dependent on three parameters to achieve or maintain its superconducting state. If any of these parameters exceeds a critical value, the superconducting state ceases and the material resumes its normal conducting state. The three parameters are temperature, current density and magnetic flux density. All these parameters have been used to achieve the desired current limitation.

An example of how to use several of the critical parameters in combination in order to produce a current limiter is described in an article in Journal of Applied Physics, 49 (4), April 1978, pages 2546-2550 by K. E. Gray and D. Fowler entitled "A superconducting fault-current limiter". This current limiter comprises two parallel-connected resistors. One resistor consists of a material which may become superconducting and which is located in a cryostat, i.e. a cryotank, in which the low temperature which is necessary to obtain a superconducting state can be attained, while at the same time the resistor is dimensioned such that the current at which the current limiter is to enter into operation gives a current density which is well below the critical density and such that also the normally surrounding magnetic flux density is lower than the critical density. In the embodiment described in the above-mentioned article, the resistance is changed from practically zero at a superconducting state to the order of magnitude of 13 k$\Omega$ when the superconducting state ceases. The second resistor is dimensioned such that its resistance is considerably lower than the resistance of the superconducting resistor when this is no longer superconducting; in the case referred to the resistance is about 3.6 $\Omega$. Under normal circumstances of the network, the superconducting resistor is kept in a superconducting state, i.e. its resistance is zero whereby current only flows through this resistor and no voltage drop occurs across the two parallel-connected resistors. Now, if the mains current because of a short-circuit or otherwise exceeds a permissible value corresponding to the value at which it is desired that the current limiter should start operating, the superconducting resistor in the described device is changed by a magnetic field partially changing the magnetic flux density around the conductor, thus obtaining a partial increase of the resistance which also results in an increase of the temperature in the resistor. Before long this will lead to the superconducting state being terminated and a predominant part of the current having to pass through the parallel-connected resistor.

Only using the critical current density to cause a superconducting material to pass from superconducting to non-superconducting state is described in DE-OS 2 712 990 entitled "Anordnung zur Ueberstrombegrenzung in elektrischen Energieversorgungsstrecken". This patent specification describes a current limiter in the form of a "superconducting cable" consisting of conductors of a material that may become superconducting and of conductors ("Matrix-/Trägermetall") dimensioned such that the superconducting cable constitutes a current-limiting element when the parallel-connected superconducting conductor is no longer superconducting. The superconducting conductor(s) is (are) formed with certain regions having area reductions ("Einschnürungen") whereby the critical current density is exceeded when the current carried through the cable exceeds the current at which the current limiter is to start operating. One problem in connection with the superconducting cable described, which is passed over in silence, is what happens to the heat development that occurs inside the cable when changing from a superconducting to a normally conducting state.

The fact that current limiters based on the two different states of a superconductor have not been used to any significant extent is due to a number of reasons. Up to a few years ago, the critical temperature lay at very low values, which entailed expensive and difficultly-manageable cooling devices, normally using helium as coolant. In part, the low use is also due to the complexity of the equipment involved, for example the equipment described in Journal of Applied Physics.

The discovery of new materials which become superconducting at a considerably higher temperature, which, for example, enables the use of liquid nitrogen as coolant, has, of course, also a positive effect on existing technical solutions.

DISCLOSURE OF THE INVENTION

The discovery of new materials and combinations of materials, for example ceramic materials, which may become superconducting at considerably higher temperatures than previously known materials has contributed to increase the interest in practical applications of this physical phenomenon. This is also true of current limiters which utilize the transition from superconducting to non-superconducting state to limit an undesirable increase of the current, for example in the line system of a power network upon a short-circuit. However, the application of the invention has nothing specifically to do with the recent discovery of materials with higher critical temperatures than before.

A fault current limiter according to the invention comprises a contact device which, in the normal state, for the most part carries the principal current which is to be limited to a permissible value. In parallel with the contact device, a resistor combination is connected, consisting of a series-connection of a first and a second resistor. A third resistor is connected in parallel with the series-connected resistors. The first and third resistors are made of a conventional resistance material. The second resistor is a resistor having superconducting properties. The superconducting resistor is dimensioned so as to change from superconducting state to a normally-conducting state when the current to be limited is of such a magnitude that the critical current density is exceeded. The third resistor could be replaced by an inductor.

The resistor/inductor combination, which is connected to the contact device, is to be dimensioned such that the current which in normal state flows through it is negligible in relation to the current by which the contact device is traversed, or in other words, the contact and lead resistance of the contact device is to be negligible in relation to the resulting resistance of the resistor/inductor combination.

The current limiter is designed to operate as follows:

The main current, which is to be limited, is measured in a conventional manner. With the aid of a discriminator or the like a signal is obtained when the current exceeds the maximally permissible value. The signal thus obtained is used as a starting signal for the opening of the contact device. As the contacts of the contact device are successively opened, the current commutates over to the parallel-connected resistor/inductor combination. Since the second resistor is still in a superconducting state, the resistance of the resistor/inductor combination will be determined by a parallel connection of the first and third resistor/inductor. Since it is desired that the greater part of the commutated current is to be carried via the first and second resistors, the resistance of the first resistor shall be considerably lower than the resistance of the third resistor/inductor. The resistance of the first resistor is also to be chosen with regard to the fact that no arc, or only a short arc, occurs across the opening contacts of the contact device.

As the commutation of the main current over to the resistor/inductor combination proceeds, the current through the parallel combination and hence also the current through the superconducting second resistor will increase. The resistor is to be geometrically dimensioned such that a critical current density is attained at the desired current limit of the current limiter. When the commutated current has reached this value, the superconducting second resistor changes to a normally conducting state. By dimensioning the third resistor/inductor considerably lower than the resistance of the normally-conducting second resistor, the commutated current will mainly flow through the third resistor/inductor.

During the commutation process, the contacts of the contact device are opened so that, when the normally-conducting state of the second resistor occurs, the distance between the opening contacts is sufficient to achieve a sufficient maximum permissible voltage.

The main current will thus now be limited by the resistance of the third resistor/inductor. A main circuit-breaker for the main current in question then enters into operation and breaks the current, which has been limited by the third resistor/inductor, within a number of cyles.

As will have been clear from the above, a contact device with very good and fast properties is required for carrying out the invention. A suitable such device is disclosed in U.S. Pat. No. 4,825,182 entitled "Electrical switching device". From this patent it is clear, for example, that the contact device has opening properties of about 4 mm/ms.

The current limiter concept according to the invention has several advantages over known current limiters based on superconducting material properties. The most important advantages are, among other things, that the main current normally passes through a mechanical contact, the contact device, and that the superconducting part of the current limiter is active for a very short time, normally less than 5 ms. This means, inter alia, that the current connections to the superconductor may have a low cross section area, which in turn reduces the consumption of coolant, which normally is nitrogen, $N_2$. In addition, this concept means that the current limiter is restored and ready for new operation as soon as the fault has been disconnected.

DESCRIPTION OF THE PREFERRED EMBODIMENTS

The dimensioning of the superconducting resistors included in the fault current limiter with respect to the cross section area in order to obtain transition at the critical current, the other resistors, the calculation of the developed power, the temperature increase, the need of coolant, and so on, are, of course, dependent on the currents that are to be limited and on the materials available at the time of construction as well as their properties, and will therefore not be described here. As will have been clear, the invention relates to the design of the current limiter and the relations between the resistors included in order to obtain the desired function.

Figure 1:
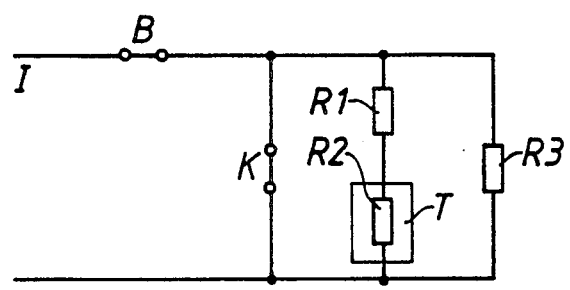
FIG. 1 shows a preferred embodiment of a fault current limiter according to the invention.

A preferred embodiment of the invention will be described with reference to FIG. 1. The current limiter comprises a contact device K. A resistor/inductor combination, consisting of a series-connection of a first resistor R1 and a second resistor R2, is connected across the opening contacts of the contact device. A third resistor R3, or alternatively a suitably dimensioned inductor, is connected in parallel with the series-connected resistors.

The first and third resistors are made from conventional resistance material. The second resistor consists of a resistor having superconducting properties and is located in a cryostat T, i.e. a cryotank in which the low temperature necessary for obtaining a superconducting state can be achieved.

In order finally to be able to break the limited current I, a circuit-breaker B is used which normally consists of the existing circuit-breaker of the system.

Figure 2:
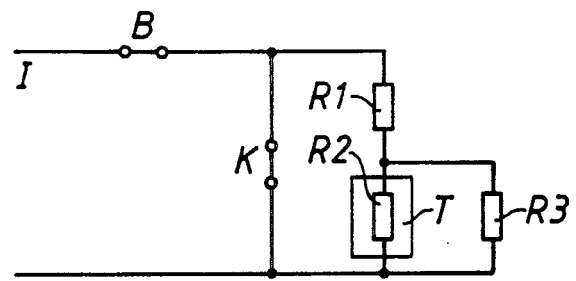
FIG. 2 shows an alternative embodiment of a fault current limiter.

An alternative embodiment of a current limiter according to the invention is clear from FIG. 2. For the most part, this device is the same as that shown in FIG. 1. The only difference is that the resistor/inductor R3, which according to FIG. 1 is connected in parallel with the series-connected resistors R1 and R2, is connected in parallel with the superconducting resistor R2 only. The requirements for the relationships between the resistors are largely the same as those for the embodiment according to FIG. 1, i.e., the resistances of the contact device and its leads are to be considerably lower than the resistances of the resistor R1 and the superconducting resistor R2 in order for the main current—in all essentials—to be carried via the contact device K. The resistor/inductor R3 connected to resistor R2 should have a resistance considerably lower than the resistance of the superconducting resistor in the normally-conducting state in order for the current to be carried via resistors R1 and R3.

In an alternative embodiment according to FIG. 2, the resistor 2 and the resistor/inductor R3 can be integrated into one unit, as described in U.S. patent application Ser. No. 362,667, now U.S. Pat. No. 4,961,066. However, this embodiment requires a considerably greater capacity of the cryotank since the heat developed in the resistor R3 must be cooled off. In addition, if the resistor R3 is placed outside the cryotank, the current limiter can be easily adapted to different power networks by changing the value of the resistance. The same applies to the resistor R3 according to FIG. 1.

We claim:

1. A fault current limiter for limiting current in electrical apparatus, comprising:
   a contact device for normally carrying current to be limited to a permissible value and having at least one pair of contacts adapted to be opened for discontinuing current through said contact device upon the sensing of a current exceeding said permissible value;
   a first resistance having a terminal connected to one contact of said pair of contacts;
   a second resistance having superconducting properties and serially connected with said first resistance, said second resistance being in a superconducting state with the current through said contacting device being lower than said permissible value and changing from said superconducting state to a normal conducting state when the current through said contact device exceeds said permissible value;
   a third resistance being connected at least in parallel with said second resistance, said third resistance having a resistance lower than the resistance of the second resistance during the normal conducting state thereof, thereby enabling the current to be carried by said first and/or third resistance and affording negligible current flow with said second resistance in said superconducting state; and
   said first resistance being much less than said third resistance such that the current from said current limiting device flows through said first and second resistances and the free terminals of said second and third resistances being connected to the other of contact of said pair of contacts.

2. A fault current limiter as claimed in claim 1, wherein said third resistor is connected in parallel across both said first and second resistors.

* * * * *